United States Patent Office.

WILLIAM ROWBOTTOM, OF ALLEGHENY, PENNSYLVANIA.

APPLICATION OF CEMENT TO PIPE-JOINTS.

SPECIFICATION forming part of Letters Patent No. 344,407, dated June 29, 1886.

Application filed February 15, 1886. Serial No. 191,938. (No specimens.)

*To all whom it may concern:*

Be it known that I, WILLIAM ROWBOTTOM, of Allegheny city, in the county of Allegheny and State of Pennsylvania, have invented a new and useful Improvement in the Application of Cement to Pipe-Joints; and I do hereby declare the following to be a full, clear, and exact description thereof.

Great difficulty has been experienced in the fitting of pipes for use in the distribution of natural gas to make the unions of the pipe-sections tight enough to prevent leakage. The gas is so subtle in its nature that it finds its way through joints which are quite secure enough to contain steam or manufactured gas with safety; hence gas-fitters, when joining natural gas-pipes, have to exercise the greatest care, and many attempts have been made to devise some means for obtaining perfect security against leaking joints, but hitherto without altogether satisfactory results.

My invention has for its object to supply this want which has long been felt by the trade, and I will now describe it, so that others skilled in the art to which it appertains may practice it.

My invention chiefly consists in a mode of use of a peculiar cement or plastic calking material, which is applied to the joints of the gas-pipes for the purpose of sealing them. The cement is a mixture of tar and asphaltum, preferably in about the following proportions, viz: of asphaltum, three and one-half parts, and two parts of tar. The melting-point of this composition is about 350° or 360° Fahrenheit. It is applied as follows: The ends of the pipe-sections which are intended to be screwed together are heated preferably to about the temperature above named, and they are then plunged into or coated with a bath of the melted cement, so that the latter may fill the screw-threads of the pipes. The pipes are then screwed together, and when the cement becomes cold it sets or hardens and makes a practically gas-tight union.

I have used this cement extensively in the course of my business as a gas-fitter, and the remarkable pressure-tests withstood by the pipes joined together have demonstrated beyond doubt the utility and practicability of my invention.

With the most approved kinds of gas-fitting devices which have heretofore been employed in the cities of Pittsburg and Allegheny, in which natural gas has been extensively introduced into dwelling-houses, it has taken about a day after the fitting has been finished to test the pipes and to repair the leaks disclosed by the test. When the pipes are coupled according to my improved method, this delay is almost entirely obviated, the only time consumed after the fitting being the hour taken in the testing, in which leaks are seldom if ever disclosed. The function of the tar in the cement is to render it tough and adhesive. The reason for heating the pipes before the application of the mixture is that I have discovered that if the pipes be cold their contact chills the cement before they have been entirely screwed together, so that the screwing becomes difficult and the threads of the pipes are not evenly and safely coated with the cement. The heating of the parts also causes all the parts of the coupling to expand equally, and as they contract evenly upon or with the cement the joint is not apt to be warped or loosened.

Liquid petroleum products are equivalents of the tar, and pitch is an equivalent of the asphaltum in the cement described by me.

It will be understood that in coupling the pipes to an intermediate sleeve or union both the pipe ends and the sleeve should be heated before being treated with the cement.

My invention is of value because it affords a simple, cheap, and easy mode of coupling pipes, and because the joint produced by its use is secure.

I do not claim the cement herein described as an article of manufacture, but only the mode of applying it, which I indicate in the following claim.

What I claim as my invention, and desire to secure by Letters Patent, is—

The method of coupling pipes, which consists in heating the parts to be coupled, coating them with a melted cement consisting of a mixture of tar and asphaltum, and then joining the parts, substantially as and for the purposes described.

In testimony whereof I have hereunto set my hand this 13th day of February, A. D. 1886.

WILLIAM ROWBOTTOM.

Witnesses:
W. B. CORWIN,
THOMAS W. BAKEWELL.